US012368408B1

(12) United States Patent
Needham et al.

(10) Patent No.: US 12,368,408 B1
(45) Date of Patent: Jul. 22, 2025

(54) SYSTEMS AND METHODS TO REDUCE TOTAL FATIGUE STRESSES IN PV FRAMES VIA CUSTOM BACKING PLATE

(71) Applicant: Holdco212, LLC, Mont Vernon, NH (US)

(72) Inventors: Christopher Thomas Needham, Mountain View, HI (US); Frank Carl Oudheusden, Mont Vernon, NH (US)

(73) Assignee: HOLDCO212, LLC, Mont Vernon, NH (US)

( * ) Notice: Subject to any disclaimer, the term of this patent is extended or adjusted under 35 U.S.C. 154(b) by 0 days.

(21) Appl. No.: 19/079,217

(22) Filed: Mar. 13, 2025

(51) Int. Cl.
*H02S 30/10* (2014.01)
*F16B 5/02* (2006.01)

(52) U.S. Cl.
CPC ............. *H02S 30/10* (2014.12); *F16B 5/02* (2013.01)

(58) Field of Classification Search
CPC ....... Y02E 10/50; Y02E 10/47; F16B 37/041; F16B 37/044; F16B 5/02; F24S 25/636; H02S 30/10; H02S 30/00
See application file for complete search history.

(56) References Cited

U.S. PATENT DOCUMENTS

| | | | | |
|---|---|---|---|---|
| 2,716,434 A * | 8/1955 | Crowther | ............... | F16B 37/044 411/174 |
| RE29,752 E * | 9/1978 | Jaconette, Jr. | ........ | F16B 37/041 439/97 |
| 4,325,598 A * | 4/1982 | Leonardo | ............. | H01R 4/2408 439/98 |
| 5,026,235 A * | 6/1991 | Muller | .................... | B25B 31/00 411/523 |
| 5,423,646 A * | 6/1995 | Gagnon | ................ | F16B 37/041 411/184 |
| 5,971,686 A * | 10/1999 | Stewart | ................. | F16B 37/062 411/181 |
| 6,688,825 B1 * | 2/2004 | Stewart | ................. | F16B 37/044 411/174 |
| 6,854,941 B2 * | 2/2005 | Csik | ....................... | F16B 37/044 411/111 |
| 6,971,830 B2 * | 12/2005 | Hulin | .................... | F16B 5/0635 411/184 |

(Continued)

FOREIGN PATENT DOCUMENTS

BR   102023017321 A2 * 3/2025
JP       2014034830 A * 2/2014

(Continued)

*Primary Examiner* — Patrick D Hawn
(74) *Attorney, Agent, or Firm* — PERKINS COIE LLP; Colin Fowler; Ben Brokesh

(57) ABSTRACT

Many PV panel frames are attached to PV panel mounting structures with through-bolting mechanisms. These PV panel frames subjected to high internal stresses around the through-bolting mechanism making them susceptible to fatigue failures. The introduction of a custom backing plate to the through-bolting mechanism can reduce PV panel frame fatigue failure when compared to the state of the art in the current through-bolting mechanism design. The custom backing plate is tuned in shape and thickness to reduce PV panel frame fatigue failure. In addition to reducing total fatigue stresses in the PV frame, the disclosed technology increases peak load rating of the PV panel frame.

25 Claims, 8 Drawing Sheets

(56) References Cited

U.S. PATENT DOCUMENTS

| | | | | |
|---|---|---|---|---|
| 7,182,563 | B2 * | 2/2007 | Wimmer | F16B 37/041 |
| | | | | 411/174 |
| 7,959,392 | B2 * | 6/2011 | Cooley | F16B 33/006 |
| | | | | 411/332 |
| 8,231,317 | B2 * | 7/2012 | De Gelis | F16B 5/0266 |
| | | | | 411/188 |
| 9,444,396 | B2 * | 9/2016 | Hirose | H02S 20/10 |
| 9,490,743 | B2 * | 11/2016 | Reynolds | H02S 40/34 |
| RE47,733 | E * | 11/2019 | West | F24S 25/67 |
| 10,756,668 | B2 * | 8/2020 | Bamat | F24S 25/70 |
| 10,851,822 | B2 * | 12/2020 | Hellin | F16B 11/006 |
| 11,649,986 | B2 * | 5/2023 | Powers, III | F24S 25/634 |
| | | | | 52/173.3 |
| 11,848,638 | B1 * | 12/2023 | Jasmin | H02S 20/23 |
| 12,018,862 | B2 * | 6/2024 | Zuritis | F24S 25/636 |
| 2011/0265860 | A1 * | 11/2011 | Ciasulli | F24S 25/634 |
| | | | | 174/126.1 |
| 2012/0017526 | A1 * | 1/2012 | Eide | E04D 13/031 |
| | | | | 52/173.3 |
| 2012/0187267 | A1 * | 7/2012 | Hudson | F24S 25/613 |
| | | | | 248/292.14 |
| 2014/0220834 | A1 * | 8/2014 | Rizzo | H01R 4/64 |
| | | | | 439/834 |
| 2014/0329420 | A1 * | 11/2014 | Magno | H01R 11/26 |
| | | | | 439/803 |
| 2015/0013754 | A1 * | 1/2015 | Yakushiji | F16M 13/02 |
| | | | | 136/251 |
| 2015/0014504 | A1 * | 1/2015 | Sponseller | F24S 25/615 |
| | | | | 248/237 |
| 2015/0034575 | A1 * | 2/2015 | Warpup | F24S 25/10 |
| | | | | 211/41.1 |

FOREIGN PATENT DOCUMENTS

| | | | |
|---|---|---|---|
| JP | 2017175791 A | * | 9/2017 |
| KR | 102209024 B1 | * | 1/2021 |

* cited by examiner

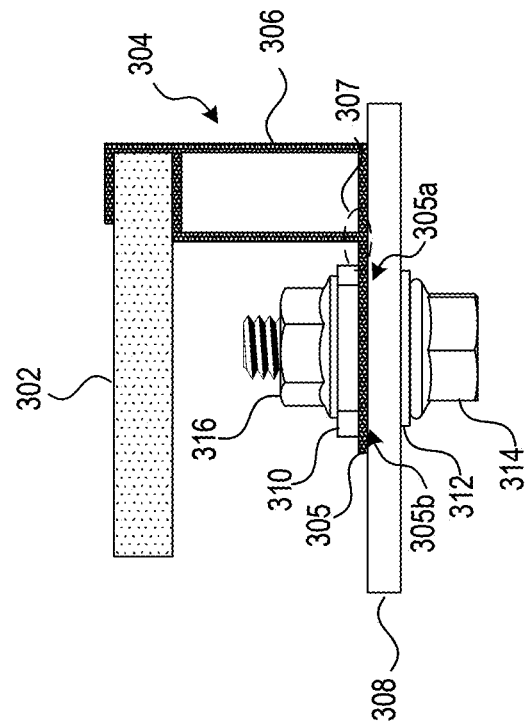
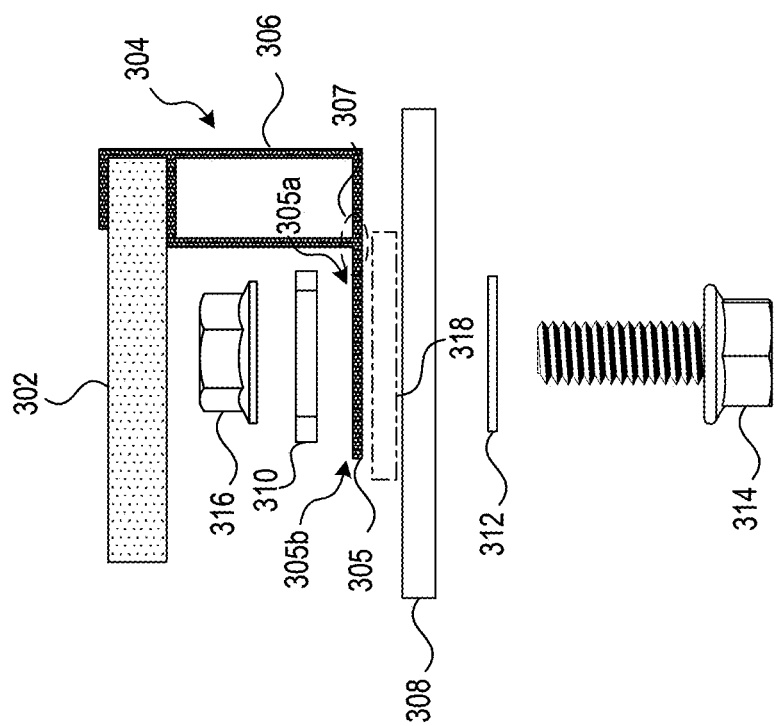
FIG. 3B
FIG. 3A

SYSTEMS AND METHODS TO REDUCE TOTAL FATIGUE STRESSES IN PV FRAMES VIA CUSTOM BACKING PLATE

BACKGROUND

Solar photovoltaic (PV) panel frames provide structural support and protection for solar cells and other components within PV panels exposed to various environmental conditions and external forces. These frames are typically made from aluminum, however, some frames are made of steel or composite materials. PV panel frames are designed with mounting holes or brackets to allow secure attachment to PV panel mounting structures (e.g., ground mounts and rooftop mounts). Common mounting designs include top-down clamps that secure the top of the panel frame to the mounting structure and through-bolting which secures the bottom flange of the frame to the mounting structure.

Over time, PV modules have trended toward larger panel areas. As PV modules have gotten bigger and frame cross sections have decreased in both area and height, PV modules are subjected to increasingly higher internal stresses. Simultaneously, to drive down costs of installed solar power, PV modules have reduced the amount of material in the panel frame. These changes have made the panel frames, and their mounting designs, more susceptible to fatigue failures.

BRIEF DESCRIPTION OF THE DRAWINGS

FIG. 3A illustrates an exploded view of a PV panel frame secured to a PV panel mounting structure using a custom backing plate.

FIG. 3B illustrates an assembled view of a PV panel frame secured to a PV panel mounting structure using a custom backing plate.

DETAILED DESCRIPTION

Figure 1:
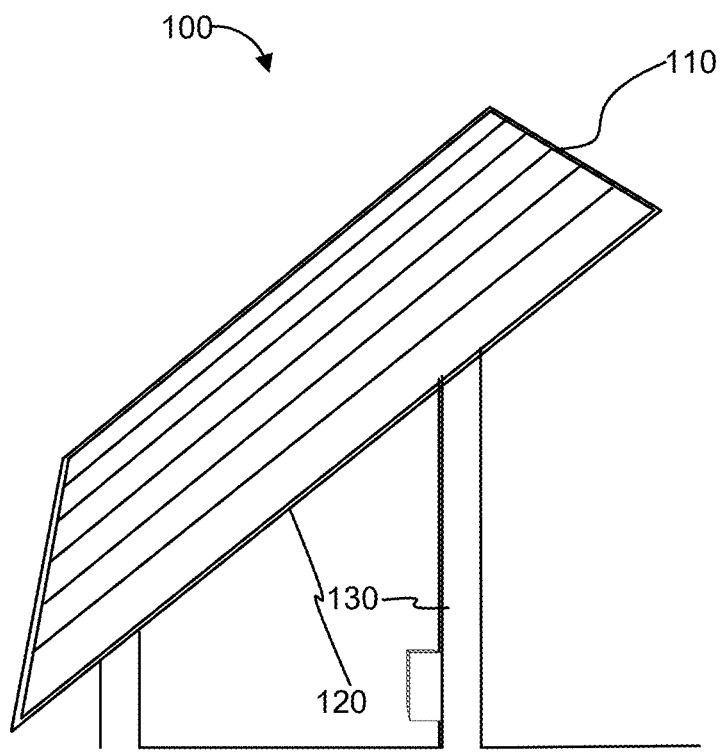
FIG. 1 illustrates a photovoltaic system.
Figure 1:
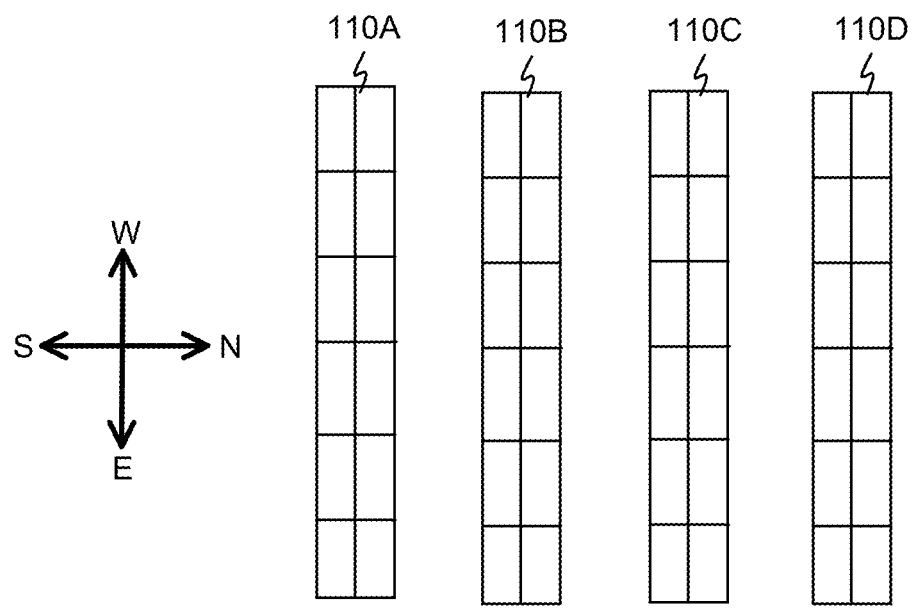

PV module fatigue failures are progressive and localized structural damage occurring when a PV module is subjected to cyclic loading or repeated stress over time. In contrast, single instance failures are structural damage caused by static, single instances of loading experienced by a PV module. The solar industry today requires PV modules to meet a variety of static load standards like peak load ratings. The solar industry today does not require PV modules to meet standards related to fatigue loading over multiple cycles. Fatigue failures, however, occur over a relatively low number of load cycles and at loads lower than the peak PV panel load rating. As such, fatigue failures can occur in PV modules well before the end of the projected lifespan—in part based on the lone static testing standards. These early PV module failures, caused by fatigue, require unexpected additional costs for solar developers and owners. The modern PV modules, with larger panel areas, decreased frame cross sections, and reduced material in the panel frames have become more susceptible to these fatigue failures and thus more susceptible to failure before the end of their projected lifespan. PV module frames made with aluminum, the most common frame type, are especially susceptible as aluminum does not have a well-defined endurance limit.

Fatigue failures are in part governed by the rate at which loading is absorbed across an area of a PV panel frame. For example, a sharp increase or decrease in load across an area of a PV panel frame is more likely to cause structural damage (e.g., a dent or tear in the frame) than a slow increase or decrease in load, even if the slow increase or decrease in load reaches a greater load magnitude. Repetitive exposures to sharp increases or decreases in load across an area of a PV panel frame only exacerbate the damage or the risk of damage. The rate at which loading is absorbed across an area of a PV panel frame, for the purposes of this disclosure, is referred to as "ramp rate." Thus, a sharp increase or decrease in load corresponds to a high ramp rate, whereas a slow increase or decrease in load corresponds to a low ramp rate.

Further, the ramp rate, or the rate at which loading is absorbed by a PV panel frame across an area, also impacts where stress is concentrated within the frame. For example, a sharp increase in load can concentrate stress around a rigid attachment point of the frame, whereas a slow increase in load can allow more of the frame itself to bend thereby spreading the load across its length. The location where the stress is concentrated within the frame, for the purposes of this disclosure, is referred to as "point-loading stress concentration."

PV modules are subjected to a variety of cyclic loads that can cause fatigue failure. Wind loads, for example, induce variable loading in the PV module that cause rapid cyclic bending and flexing of the PV panel frame. The PV module can experience thousands of these fluctuating wind load events, and thereby thousands of load cycles, in just a few hours (e.g., a PV module experiencing 10,000 load cycles during a single 12-hour hurricane). Further, these oscillations can be induced by wind with a wide range of wind speeds. Thus, a PV module subjected to wind speeds at a fraction of their rated maximum wind speed may still fail due to fatigue caused by wind-induced load cycles. In addition to wind, other environmental forces like snow, ice, temperature fluctuations, and seismic events subject PV modules to cyclic loads that induce fatigue failures.

In many cases, the cause of PV panel fatigue failures is localized stress imparted to a PV panel frame by through-bolting. One typical application of through-bolting uses a round washer on top of the bottom flange of a panel frame and an 8 mm bolt to secure the panel to the underlying racking superstructure. Washers in these applications have been shown to cause high ramp rates and high point-loading stress concentrations in PV panel frames subject to environmental loads at a point near the washer edge where the bottom flange meets the vertical box of the panel frame. Round washers cause high a ramp rate and high point-loading stress concentration at this point because, as the panel frame flexes into the washer, the washer curvature creates a relatively small edge that digs into the panel frame. This high ramp rate and high point-loading stress concentration leads to fatigue failures of panel frames under environmental forces like sustained wind uplift.

Further, point-loading stress concentration from through-bolting is often worsened by PV panel mountings that maximize bending loads of the panel frame at the same mounting point. One example of this is the use of short rails to mount PV panels to tracker superstructures. In many cases, the through-bolts of the short rails are positioned at the edge of the rail with the majority of the PV panel extending away from the attachment point. Thus, under wind loads, the positioning of the through-bolt acts as a fulcrum, leaving the PV panel frame at a mechanical disadvantage due to the long lever arm of the remaining PV panel. The combination of high point-loading, high ramp rates, and maximum bending loading leads to real-world panel frame failures at lower than design wind speeds and is not accounted for by the static test standards, such as IEC 61215, in use by industry today.

Alternative methods of through-bolting have been shown to increase peak load rating when compared to round washers under static test standards but not eliminate fatigue failure loading. One example is the use of rectangular backing plates. These plates move the location of point-loading stress concentration experienced where the bottom flange meets the vertical box of the panel frame from the bolt hole (as in the case of a circular washer) to the edge of the rectangular backing plate. In some cases, these rectangular backing plates are thickened to reduce the ability of the PV panel frame to move about the attachment point and thereby increase peak load rating. However, the rectangular backing plate edges still cause point-loading stress as cyclic loading bends and flexes the frame about the rectangular plate edges.

Further, in some instances, a rectangular backing plate actually increases point-loading stress concentration and ramp rates beyond what would occur for an industry standard round washer. For example, cyclic loading that causes frame bending and flexing perpendicular to a rectangular backing plate edge can cause the flat backing plate edge to dig into the panel frame. Since the rectangular backing plate edge is straight and has a sharp cut off on each side of the backing plate edge, the panel stress is localized along the edge and, in particular, the backing plate corners. Further, some rectangular backing plates are thicker than the average round washer. Thicker rectangular backing plates, however, bend less under environmental loading causing the PV panel frame to absorb the load more quickly at the corners of the rectangular backing plate, thereby inducing a high ramp rate. As such, alternative methods of through-bolting like rectangular backing plates still result in PV panels in real-world applications failing under environmental loading (e.g., wind) much lower than the environmental loading the PV panels are certified for under current static test standards.

The disclosed technology relates techniques for through-bolting a PV module frame to a racking superstructure that reduce point loading from the attachment hardware in order to reduce total fatigue stresses in the PV frame. In addition to reducing total fatigue stresses in the PV frame, the disclosed technology increases peak load rating of the PV panel frame. In the disclosed technology, a custom backing plate for through-bolting a PV module frame to a racking superstructure is tuned to deflect to a shape that a PV panel frame naturally takes under a specified design load. For example, the shape a cantilevered beam creates subject to a load on its free end. As such, the custom backing plate distributes the load into the PV panel frame without sharp increases or decreases in load along the frame-washer interface length, thereby decreasing fatigue failures.

In the disclosed technology, the custom backing plate can be tuned based on custom backing plate shape and thickness. Regarding the custom backing plate shape, the shape can be tuned to have a decreasing profile section modulus, or cross-sectional bending resistance strength, from the bolt hole to the furthest end of the plate. In one embodiment, the profile section modulus decreases approximately linearly from the bolt hole location to the furthest end to match the decrease in bending load imparted to the custom backing plate by the PV panel frame. This approximately linearly decreasing profile section modulus yields a custom backing plate that adopts a smooth deformation shape under load. Since the PV panel frame also deflects around this point loading, the smooth deformed shape of the plate washer provides a mating surface with the PV panel frame that has a more even surface pressure between the parts than any other washer type in use in the industry today. Further, this more even surface pressure minimizes localized stress concentration from the bolt point load thereby minimizing total stress in the PV frame. Thus, PV modules with a custom backing plate tuned as described above experience an increase in total allowable load cycles and a reduction of fatigue failures in the field.

To achieve the decreasing profile section modulus described above, in some embodiments, the custom backing plate includes a varying profile that is wider at the center of the plate around the bolt location and transitions to thinner sections at the ends of the plate furthest from the bolt location. The varying profile width allows the plate to maintain a continuously increasing deflection along the length of the plate, lowering the peak stress loading into the PV panel frame and more evenly distributing the load from the panel frame into the securing bolt. In some embodiments, the varying profile creates a "D" or triangular shape.

Regarding the custom backing plate thickness, the shape can be tuned to have a plate thickness that provides an appropriate amount of plate deflection for a given PV panel frame and loading condition. Tuning for the right plate thickness impacts the usability of the custom backing plate. For example, if the plate thickness is too low, the backing plate will deform across too much of its span and stress will still be concentrated too heavily around the though-bolt location. Instead, if the plate thickness is too high, stress will be concentrated in points about the plate edge where the bottom flange meets the vertical box similar to the rectangular backing plate described above. In both instances, point-load stress concentration is higher than a plate with the optimum thickness. Thus, the tuning of the custom backing plate thickness allows the backing plate to progressively bend from the bolt at the center to the tip such that stress is carried into the module frame more evenly over the span of the plate. This effect increases the number of cycles that the panel can experience prior to fatigue failure.

In some embodiments of the disclosed technology, electrical bonding features and hardware are integrated into the custom backing plate. For example, in one embodiment, the custom backing plate includes a captured nut to ease installation and reduce the risk of hardware loosening under cyclical loading. Electrical bonding features eliminate the need for separate bonding, reducing installation labor and material costs.

FIG. 1 illustrates a photovoltaic (PV) system 100, according to some embodiments. The PV system 100 includes a PV panel 110, a racking or superstructure 120, and a foundation 130. The PV system 100 is configured to generate electricity and may be used alone or with other similar photovoltaic systems in, for example, a photovoltaic power station.

The PV panel 110 includes an array of one or more photovoltaic modules configured to convert solar energy into electricity by the photovoltaic effect. The PV panel 110 is coupled to a power grid, battery, or other power transmission or storage system to output energy captured by the PV panel 110. The amount of electricity produced by each photovoltaic module is often (depending on a number of location-connected factors) a function of at least the angle of incidence of light on the surface of the module, where more energy is captured when light is perpendicular to the surface (i.e., a zero-degree angle of incidence) than when light is incident at higher angles. Each of the PV panels are not directly connected to other panels, the positioning of one panel is insulated from the positioning of other panels.

The PV system 100 includes a number of PV panels 110 across a repeating pattern of racking or superstructure 120, and foundation 130. The repeating pattern continues across the course of a given solar farm. The PV system 100 typically arranges PV panels 110A-D into rows that make up a solar farm or solar project. However, it is contemplated that individual panels 110 are a valid configuration.

Figure 2A:
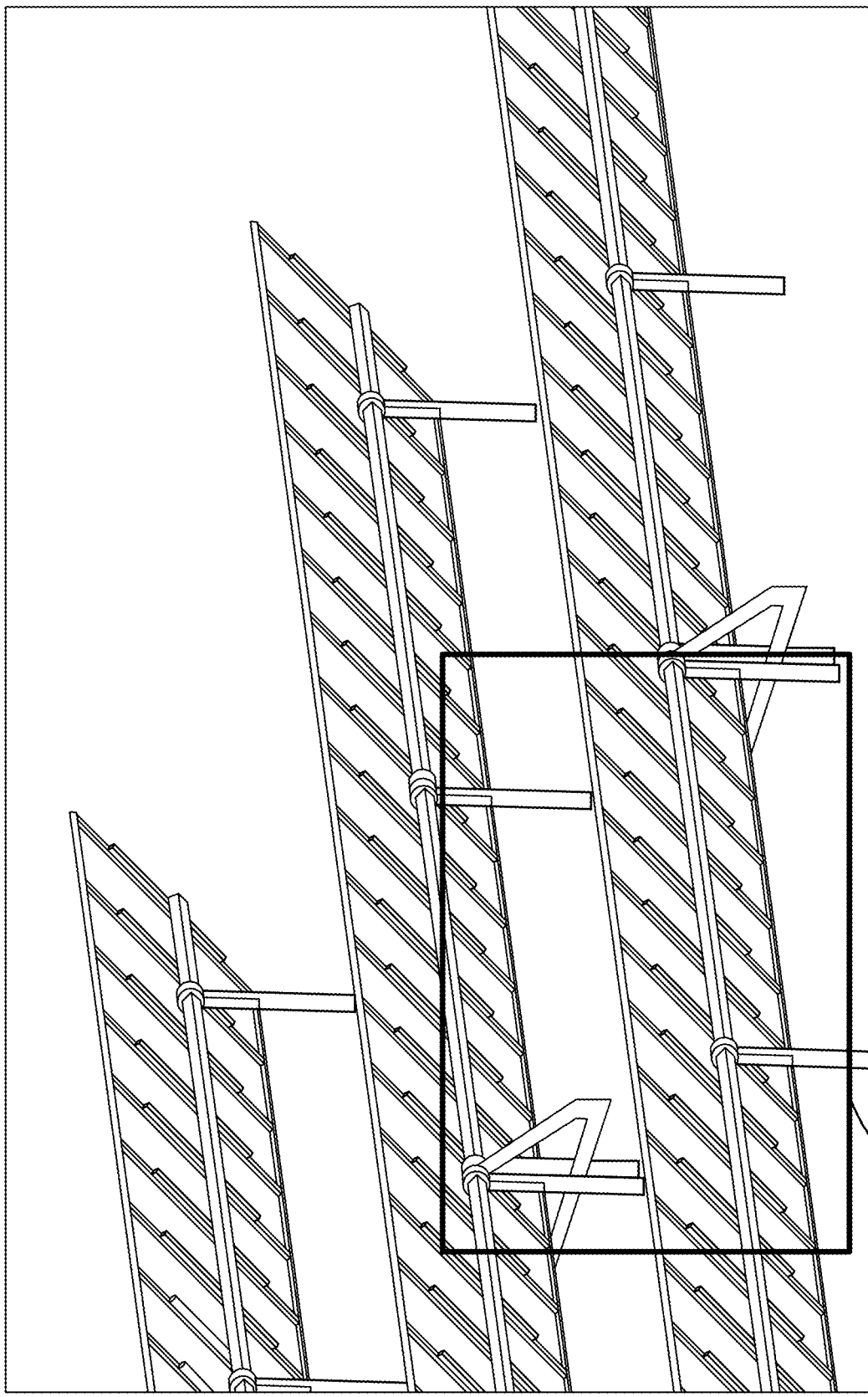
FIG. 2A illustrates a backside of a photovoltaic system where PV panel frames are attached to PV panel mounting structures.

FIG. 2A illustrates a backside of a photovoltaic system (e.g., photovoltaic system 100 of FIG. 1) where PV panel frames are attached to PV panel mounting structures. Box A identifies a portion of the photovoltaic system using the custom backing plate of the disclosed technology. The elements of Box A are described further with respect to FIG. 2B below.

Figure 2B:
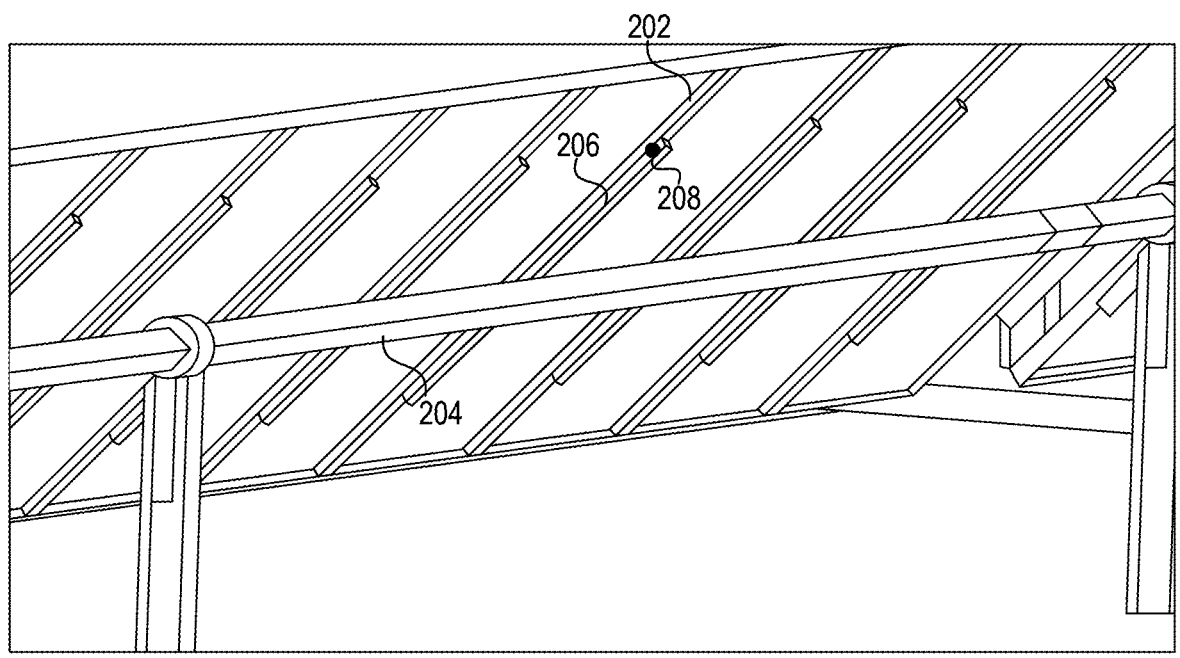
FIG. 2B is a zoomed in view of a portion of FIG. 2A illustrating where a through-bolt secures a PV panel frame to a PV panel mounting structure.

FIG. 2B is a zoomed in view of a portion of FIG. 2A corresponding to Box A illustrating where a through-bolt secures a PV panel frame to a PV panel mounting structure. FIG. 2B includes PV panel frame 202, PV panel mounting structure 204, purlin 206, and binding 208 between the purlin 206 and the PV panel frame 202. PV panel frame 202 provides structural support and protection for the solar cells and other components of the PV system. PV panel mounting structure 204 is a structure designed to hold and secure photovoltaic panels in place. In some embodiments, PV panel mounting structure 204 is a tracking system that moves PV panel modules (including the PV panel frames) about an axis to adjust an angle of incidence of the sunlight on the surface of the PV modules. In other embodiments, PV panel mounting structure 204 is a fixed-tilt system (i.e. a system with no tracking capabilities).

PV panel mounting structure 204 includes purlin 206. Purlin 206 is a structural beam (e.g., a steel beam) of PV panel mounting structure 204 that provides a location to attach PV panel frame 202 to PV panel mounting structure 204 through binding 208. Binding 208 uses the custom backing plate of the disclosed technology and a through-bolt to secure PV panel frame 202 to purlin 206 of PV panel mounting structure 204. In some embodiments, purlin 206 is bound to PV panel frame 202 with two or more bindings.

FIG. 3A illustrates an exploded view of a PV panel frame secured to a PV panel mounting structure using a custom backing plate (e.g., the backing plate of binding 208 of FIG. 2B). FIG. 3A includes module glass 302, PV panel frame 304, flange 305, flange interior 305a, flange exterior 305b, vertical box 306, connection point 307, purlin 308, custom backing plate 310, washer 312, bolt 314, nut 316, and grounding washer 318. Module glass 302 is a sheet of glass covering the photovoltaic cells of PV modules to protect the cells from environmental conditions. Typically, the photovoltaic cells of a solar panel are sandwiched between the module glass and the back sheet with encapsulant layers on both sides. The photovoltaic cells and encapsulant layers are omitted from FIG. 3A for clarity. Module glass 302 is connected to PV panel frame 304 as shown.

PV panel frame 304 is comprised of flange 305, vertical box 306, and connection point 307. Flange 305 is a horizontal member of PV panel frame 304 that facilitates the binding of PV panel frame 304 to purlin 308. Flange 305 has a flange interior 305a and a flange exterior 305b. The flange interior 305a is the portion of the flange adjacent to vertical box 306 (e.g., the flange portion of connection point 307 described below) whereas the flange exterior 305b is the portion of the flange opposite vertical box 306 (e.g., the free end of the flange on the left side of FIG. 3A). Vertical box 306 is a vertical section of the frame that separates the photovoltaic cells and their protective coverings from the binding points between the frame and the purlin. Connection point 307 is the point of the frame cross section of FIG. 3A where flange 305 and vertical box 306 meet. Generally, the point-loading stress concentration caused by conventional washers (e.g., round washers and rectangular washers) is located at connection point 307 along a length of PV panel frame 304. However, point-loading stress concentration caused by conventional washers are, depending on the environmental load and washer type, found throughout the interior and exterior of the flange.

In the disclosed technology, PV panel frame 304 need not be shaped exactly as pictured in FIG. 3A. For example, vertical box 306 can have a different shape or proportion. Further, in some embodiments, flange 305 of PV panel frame 304 extends beyond purlin 308 (e.g., flange interior 305a and vertical box 306 hang off purlin 308). Additionally, module glass 302 need not be connected to PV panel frame 304 exactly as pictured in FIG. 3A.

Purlin 308 is a portion of the PV panel mounting structure (e.g., purlin 206 of PV panel mounting structure 204 in FIG. 2B). Purlin 308 is a structural beam (e.g., a steel beam) of the PV panel mounting structure that provides a location to attach PV panel frame 304 to the PV panel mounting structure.

In the disclosed technology, PV panel frame 304 is secured to purlin 308 via custom backing plate 310, washer 312, bolt 314, and nut 316. Custom backing plate 310 is inserted between flange 305 and nut 316. Then, bolt 314 is passed through washer 312, purlin 308, backing plate 310, and threaded into nut 316 to secure PV panel frame 304 to purlin 308. In some embodiments, grounding washer 318 is inserted between flange 305 and purlin 308. Grounding washer 318 is used to improve the PV panel system's grounding by establishing an electrical connection between the metal components of the PV system, such as the PV panel frame, the mounting structure, and grounding conductors.

Securing PV panel frame 304 to purlin 308 creates the conditions, under environmental loading, for fatigue failure of PV panel frame 304. For example, under a wind load, PV panel frame 304 is often forced upward away from purlin 308. However, due to the through-bolting mechanism, flange 305 remains in place while vertical box 306 is pushed upward about the through-bolt mechanism. As such, the flange interior 305a and connection point 307 experience a bending effect, causing PV panel frame 304 to absorb the load imparted by the wind in the flange interior 305a (typically at or near connection point 307).

Custom backing plate 310 is designed to reduce total fatigue stresses in the PV panel frame 304 by providing support to flange 305 such that, under environmental loading, the load is distributed into flange 305 and PV panel frame 304 without a high ramp rate or high point-loading stress concentration. To achieve this load distribution, custom backing plate 310, in some embodiments, is designed to resist the environmental loading such that flange 305 deflects underloading similar to the deflection of a cantilever beam subject to a load on its free end. In addition to reducing total fatigue stresses in the PV panel frame 304, custom backing plate 310 increases the peak load rating of PV panel frame 304. Custom backing plate 310 is described further with respect to FIGS. 4A and 4B below.

FIG. 3B illustrates an assembled view of a PV panel frame secured to a PV panel mounting structure using a custom backing plate. FIG. 3B includes the same module glass 302, PV panel frame 304, flange 305, flange interior 305a, flange exterior 305b, vertical box 306, connection point 307, purlin 308, custom backing plate 310, washer 312, bolt 314, and nut 316 of FIG. 3A. FIG. 3B excludes grounding washer 318 of FIG. 3A.

Figure 4B:
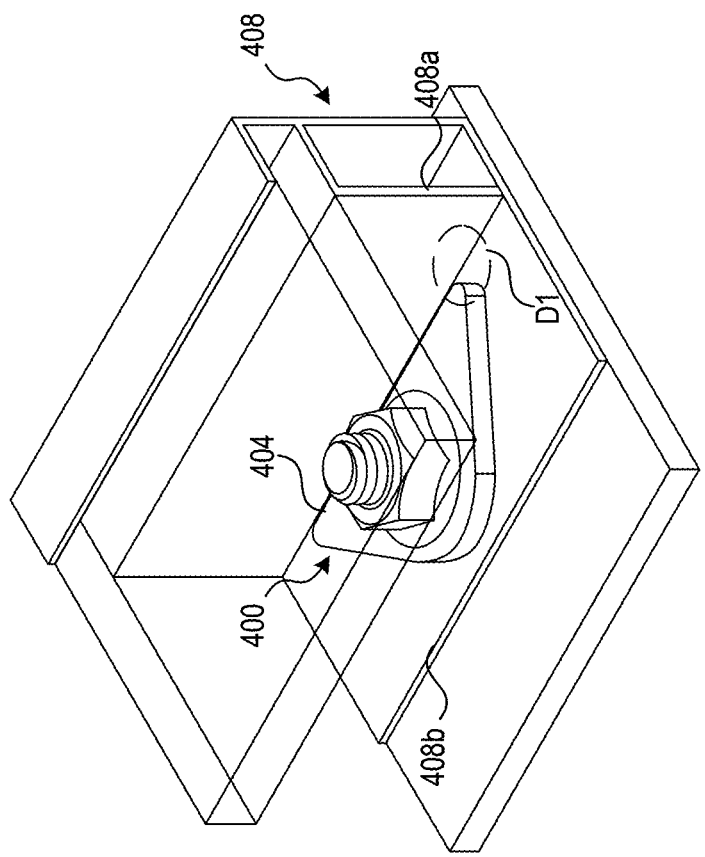
FIG. 4B illustrates an isometric view of a PV panel frame secured to a PV panel mounting structure using a custom backing plate.
Figure 4A:
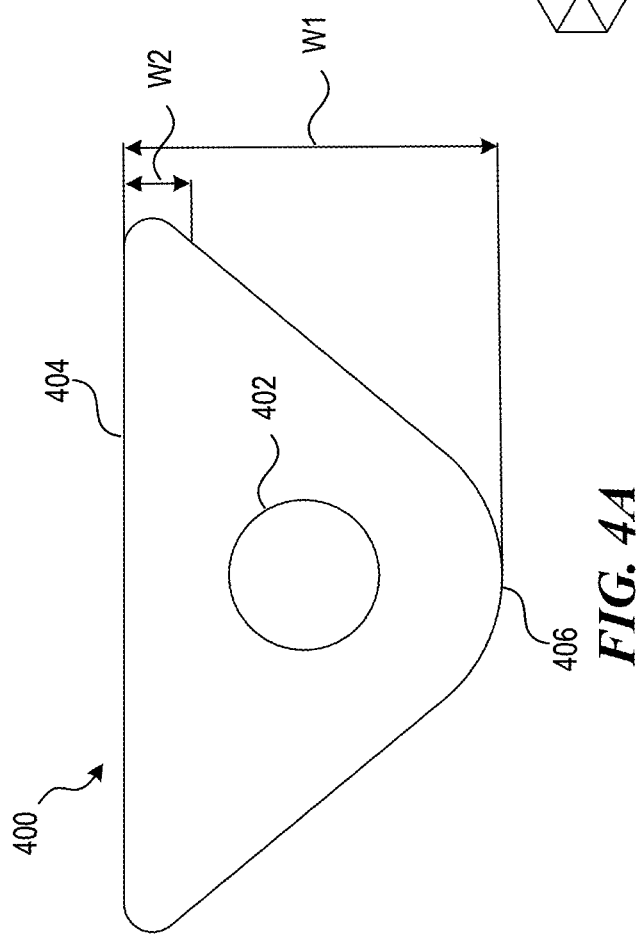
FIG. 4A illustrates a top view of a custom backing plate of the disclosed technology.

FIG. 4A illustrates a top view of a custom backing plate of the disclosed technology (e.g., custom backing plate 310 of FIG. 3A). The custom backing plate is tuned by its shape to reduce total fatigue stresses in a PV panel frame by providing support to the PV panel frame flange such that, under environmental loading, the load is distributed into the PV panel frame without a high ramp rate or high point-loading stress concentration. In one embodiment, the profile section modulus, or cross-sectional bending resistance strength, decreases approximately linearly from the bolt hole location to the furthest end to match the decrease in bending load imparted to the custom backing plate by the PV panel frame. This approximately linearly decreasing profile section modulus yields a custom backing plate that adopts a smooth deformation shape under load. Since the PV panel frame also deflects around this point loading, the smooth deformed shape of the plate washer provides a mating surface with the PV panel frame that has a more even surface pressure between the parts than other washer types in use in the industry today (e.g., round and rectangular washers). This more even surface pressure minimizes localized stress concentration from the bolt point load thereby minimizing total stress in the PV frame. Thus, PV modules with a custom backing plate tuned as described above experience an increase in total allowable load cycles and a reduction of fatigue failures in the field.

In some embodiments, as shown in FIG. 4A, the custom backing plate shape is tuned to be a tapered backing plate 400 including a through-bolt hole 402, a side 404 longer than opposing side 406, and a first width W1 larger than a second width W2. The larger first width W1 than second width W2 gives tapered backing plate 400 a varying profile that is wider at the center of the plate around through-bolt hole 402 and thinner at the ends of the plate furthest from through-bolt hole 402 on side 404. As described further with respect to FIG. 4B below, side 404 is positioned proximate to the flange interior to reduce total fatigue stresses in a PV panel frame.

The wider center of tapered backing plate 400 allows tapered backing plate 400 to resist bending at its center more than its ends. Due to the positioning of side 404, under environmental loading, as the PV panel frame lifts up from the PV mounting structure, the length of side 404 spreads the load imparted on the PV panel frame across a larger distance than a round washer, avoiding the high ramp rate and point-loading stress concentration of round washer. This load spreading effect is similar to the rectangular washer described above. However, unlike the rectangular washer, the smaller second width W2 allows tapered backing plate 400 to flex more at the ends of the plate than around through-bolt hole 402. The ability for tapered backing plate 400 to flex more at its ends reduces the rate at which load is absorbed by the PV panel frame about the plate ends. Thus, unlike rectangular washer, tapered backing plate 400 does not concentrate the load on the PV panel frame at its ends away from through-bolt hole 402.

In some embodiments, as shown in FIG. 4A, tapered backing plate 400 includes rounded edges. These rounded edges further reduce the ramp rate and point-loading stress concentration experienced by the PV panel frame when compared to the rectangular backing plate by removing the 90-degree corners of rectangular backing plate ends. In rectangular backing plates, the 90-degree corners exacerbate ramp rate and point-loading stress concentration effects on the PV panel by localizing loading effects around a sharp 90-degree corner point.

FIG. 4B illustrates an isometric view of a PV panel frame secured to a PV panel mounting structure using tapered backing plate 400 of FIG. 4A. In FIG. 4B, tapered backing plate 400 is positioned on flange 408b of PV panel frame 408 with side 404 a distance D1 from vertical box 408a. As described above, side 404 of tapered backing plate is positioned proximate to the flange interior of flange 408b to reduce total fatigue stresses in a PV panel frame 408. In some embodiments, tapered backing plate 400 is positioned to abut vertical box 408a such that distance D1 is equal to 0 mm. In other embodiments, tapered backing plate is positioned at a distance D1 up to 3 mm away from vertical box 408a.

Figure 5A:
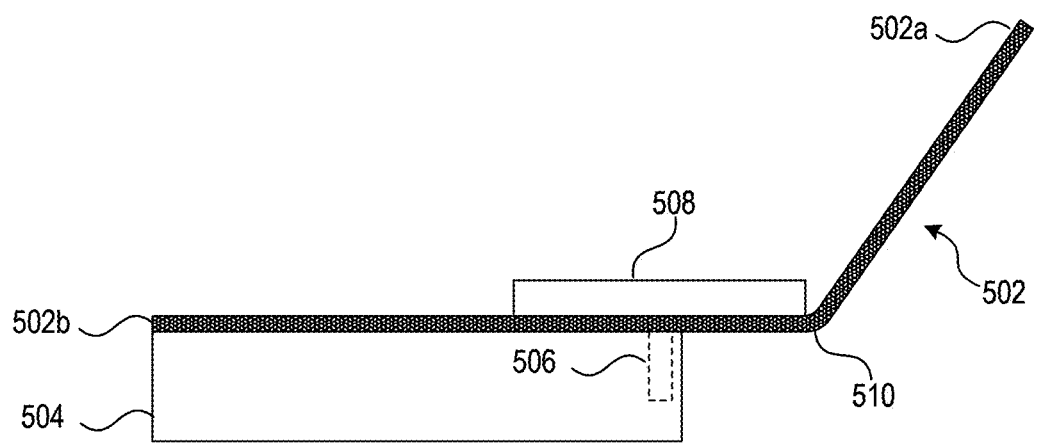
FIGS. 5A-C illustrate custom backing plates of varying thickness.
Figure 5B:
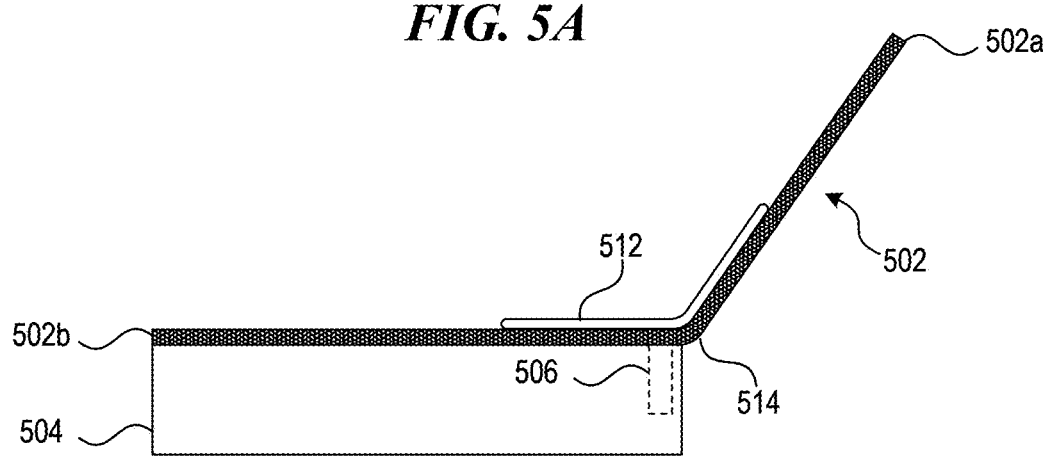
Figure 5C:
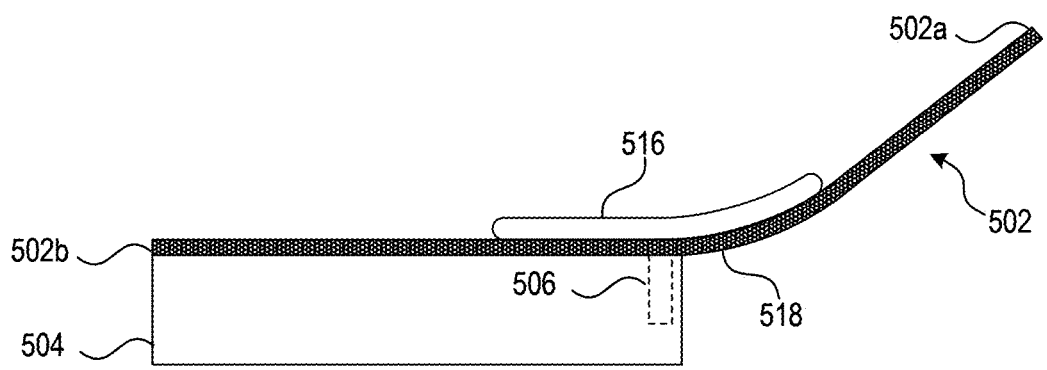

FIGS. 5A-C illustrate custom backing plates of varying thickness. Similar to tuning by shape, the custom backing plate is tuned by its thickness to reduce total fatigue stresses in a PV panel frame. FIG. 5A illustrates a thick custom backing plate 508 used to secure PV panel frame flange 502 to purlin 504 with through-bolt 506. PV panel frame flange 502 has a flange interior 502a and a flange exterior 502b. In FIG. 5A, thick custom backing plate 508 is thick enough to resist bending under the environmental load experienced by PV panel frame flange 502. As such, PV panel frame flange 502 is forced by the environmental load (e.g., a wind load) to bend around the edge of thick custom backing plate 508 causing stress point 510. Since thick custom backing plate 508 does not flex with PV panel frame flange 502, PV panel frame flange 502 quickly absorbs the load at stress point 510 resulting in a high ramp rate and high point-loading stress concentration. Many round and rectangular washers are not tuned to proper thickness and, when too thick, cause these high ramp rates and high point-loading stress concentrations leading to PV panel frame fatigue failures.

FIG. 5B illustrates a thin custom backing plate 512 used to secure PV panel frame flange 502 to purlin 504 with through-bolt 506. PV panel frame flange 502 has a flange interior 502a and a flange exterior 502b. In FIG. 5B, thin custom backing plate 512 fails to adequately resist bending under the environmental load experienced by PV panel frame flange 502. As such, PV panel frame flange 502 is forced by the environmental load (e.g., a wind load) to bend around through-bolt 506 causing stress point 514. The ability of thin custom backing plate 512 to flex lowers the ramp rate experienced by PV panel frame flange 502 when compared to the thick custom backing plate 508. However, thin custom backing plate 512 flexes too much, causing higher peak loading and higher point-loading stress concentration at stress point 514 of PV panel frame flange 502. Thus, custom backing plates tuned with too little thickness still cause PV panel frame fatigue failures.

FIG. 5C illustrates an ideal custom backing plate 516 used to secure PV panel frame flange 502 to purlin 504 with through-bolt 506. PV panel frame flange 502 has a flange interior 502a and a flange exterior 502b. In FIG. 5B, ideal custom backing plate 516 has enough thickness to resist the environmental loading experienced by PV panel frame flange 502 but is thin enough to flex with PV panel frame flange 502. The ability of ideal custom backing plate 516 to resist the environmental loading while still bending with PV panel frame flange 502 lowers the ramp rate experienced by PV panel frame flange 502 while still spreading the load across PV panel frame flange 502 to mitigate point-loading stress concentration. As such, PV panel frame flange 502 is allowed to bend more naturally—similar to a cantilever beam with a force applied to its free end—in response to the environmental load (e.g., a wind load). The more natural bend creates a bend area 518. As shown, bend area 518 is a gradual bend having a low to moderate bend angle across bend area 518 when compared to stress points 510 and 514 of FIGS. 5A and 5B. Thus, the tuning of the custom backing plate thickness to an ideal thickness allows the backing plate to progressively bend from the bolt at the center to the tip such that stress is carried into the module frame more evenly over the span of the plate. This effect increases the number of cycles that the panel can experience prior to fatigue failure.

In some embodiments, ideal custom backing plate 516 has a constant thickness. In other embodiments, ideal custom backing plate 516 has a varying thickness. In such embodiments, the varying thickness of ideal custom backing plate 516 further tunes the shape made by PV panel frame flange 502 to create a particular bend area 518.

In FIGS. 5A-C PV panel frame flange 502 is shown extending beyond purlin 504. In some embodiments, as described above, through-bolts used to mount PV panels to short rails are positioned at the edge of the rail with the majority of the PV panel and PV panel frame extending away from the attachment point of the purlin. Further, while shown with PV panel frame flange 502 extending beyond purlin 504, the effects described above with respect to FIGS. 5A-C still occur if PV panel frame flange 502 does not extend beyond purlin 504 (as shown in the exploded and assembled views of FIGS. 3A and 3B).

Figure 6A:
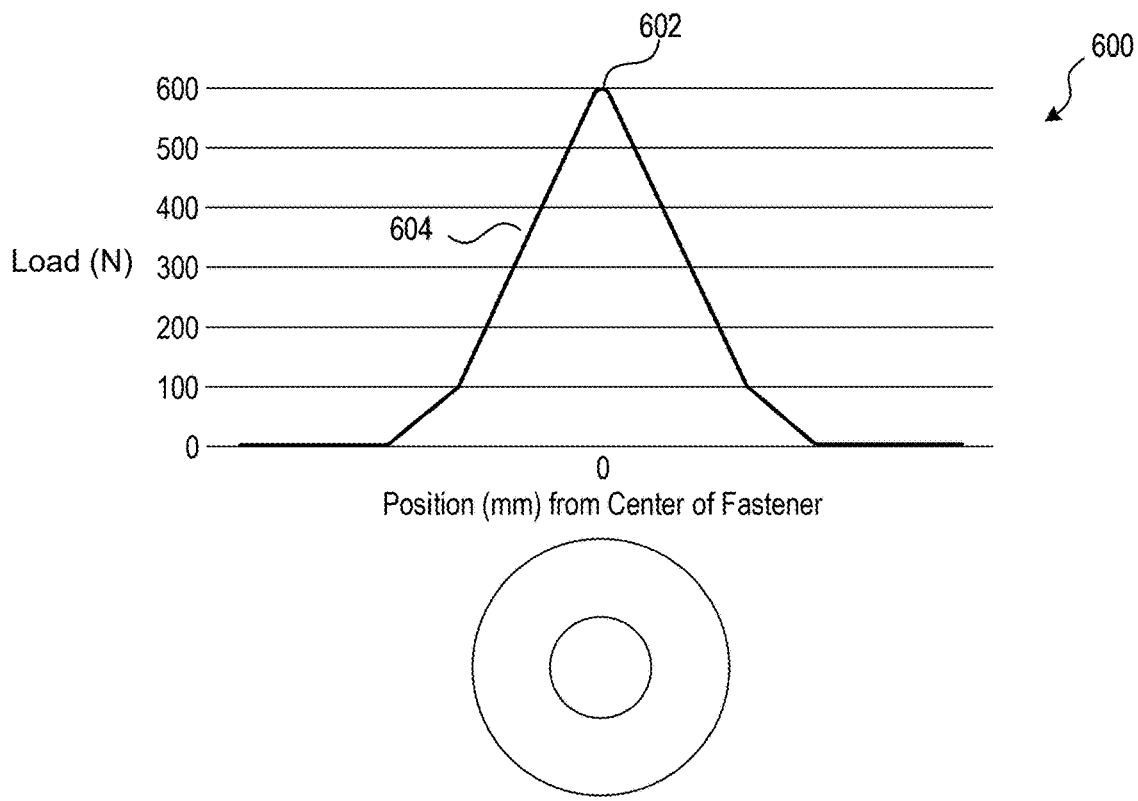
FIGS. 6A-C illustrate loading across PV panel frame through-bolting mechanisms with varying backing plate shapes subject to an example 1500N environmental load.
Figure 6B:
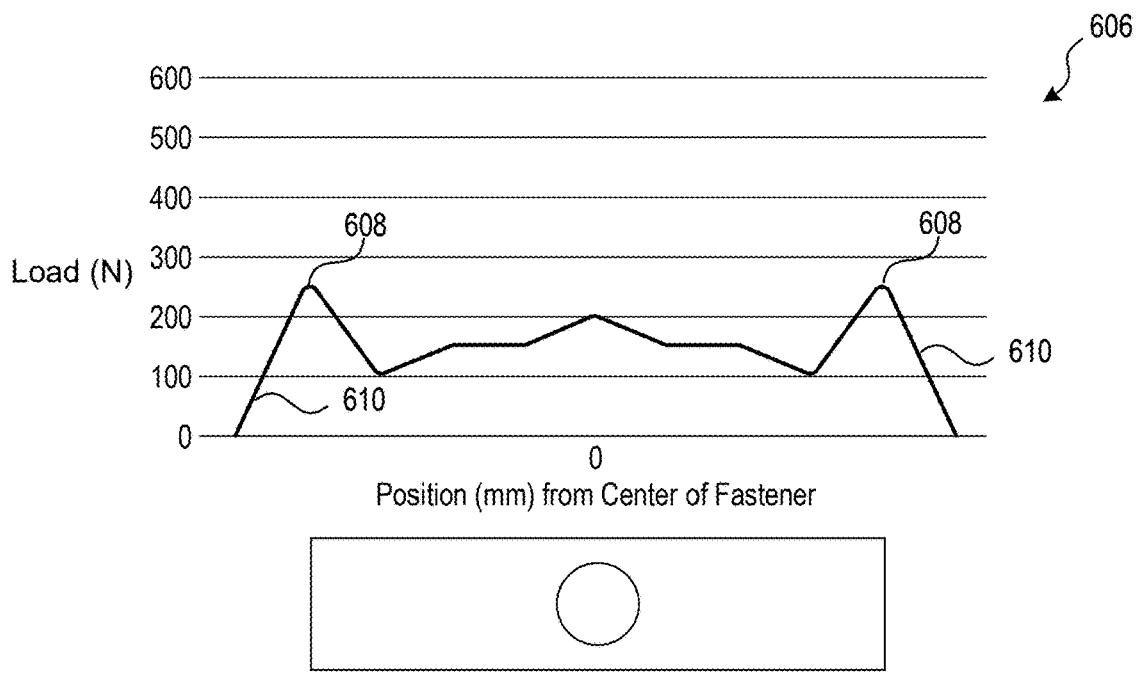
Figure 6C:
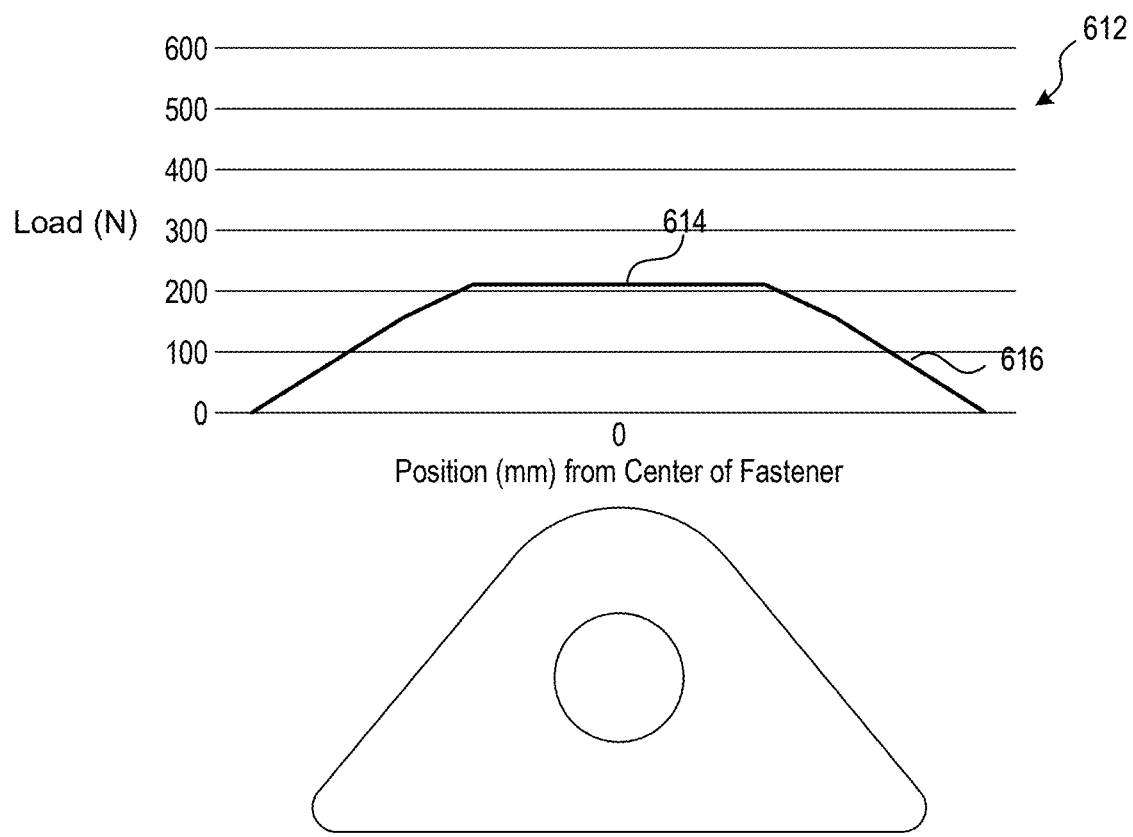

FIGS. 6A-C illustrate loading across PV panel frame through-bolting mechanisms with varying backing plate shapes subject to an example 1500N environmental load. As described above, fatigue failures are in part governed by the rate at which loading is absorbed across an area of a PV panel frame, known as the ramp rate. A sharp increase or decrease in load corresponds to a high ramp rate, whereas a slow increase or decrease in load corresponds to a low ramp rate. A high ramp rate experienced by a particular point in a PV panel frame is more likely to cause structural damage (e.g., a dent or tear in the frame) than a slow increase or decrease in load, even if the slow increase or decrease in load reaches a greater load magnitude. The slope of the graphs in FIGS. 6A-C correspond to the ramp rate experienced by the PV panel frame about the through-bolting mechanism subjected to the example 1500N environmental load. In some embodiments, the through-bolting mechanism in each of FIGS. 6A-C is one of four through-bolting mechanisms securing a PV panel frame to a PV panel mounting structure. In these embodiments, the PV panel frame can be subject to a total panel environmental loading of 6000 N, resulting in a 1500 N point load at each of the four through-bolting mechanisms.

FIG. 6A illustrates loading across a PV panel frame secured to a PV panel mounting structure with a round washer subject to an example 1500N environmental load. In FIG. 6A, graph 600 records the load experienced by the PV panel frame relative to the position from the center of the fastener securing the PV panel frame to the PV panel mounting structure (i.e. a through-bolt with a round washer). Graph 600 includes a peak load 602 corresponding to a high point-loading stress concentration and a slope 604 corresponding to a high ramp rate.

As described above, round washers have been shown to cause high point-loading stress concentration of PV panel frames subject to environmental loads at a connection point near the washer edge where the bottom flange meets the vertical box of the panel frame. In graph 600, the round washer creates a high point-loading concentration resulting in a peak load 602 of 600 N in response to the 1500 N environmental load at the connection point aligned with the center of the through-bolt. The round washer causes this high point-loading at this point because, as the panel frame flexes into the washer, the washer curvature creates a relatively small edge that digs into the panel frame.

Further, as shown in graph 600, the round washer creates a steep slope 604 that corresponds to a high ramp rate. Round washers typically cause high ramp rates because their radius and curvature cannot spread load further across the PV panel frame. For example, a round washer with an 8 mm radius can only spread load across approximately 16 mm of the PV panel frame. Whereas, a rectangular washer with a 40 mm length can spread the same load across 40 mm of the PV panel frame. Thus, round washer of FIG. 6A has both a high peak load 602 of 600 N as well as a high ramp rate (slope 604) due to having to spread 1500 N over just 16 mm of the PV panel frame.

FIG. 6B illustrates loading across a PV panel frame secured to a PV panel mounting structure with a rectangular washer subject to an example 1500N environmental load. In FIG. 6A, graph 606 records the load experienced by the PV panel frame relative to the position from the center of the fastener securing the PV panel frame to the PV panel mounting structure (i.e. a through-bolt with a rectangular washer). Graph 600 includes peak loads 608 corresponding to low point-loading stress concentrations and slopes 610 corresponding to high ramp rates.

Rectangular washers have been shown in increase peak load ratings of PV panel frames. In graph 606, the rectangular washer spreads the 1500 N load across more of the PV panel frame relative to the round washer of 6A leading to peak load 608 reaching only 250 N. These washers move the location of point-loading stress concentration experienced where the bottom flange meets the vertical box of the panel frame from the bolt hole (as in the case of a circular washer) to the edge of the rectangular washer. Spreading the load in this way improves the PV panel frame peak loading; however, the rectangular backing plate edges still cause point-loading stress and high ramp rates as cyclic loading bends and flexes the frame about the rectangular plate edges.

As shown in graph 606, the edges of rectangular washers, particularly thick rectangular washers, still induce a high ramp rate (slopes 610) in the PV panel frame. While the rectangular washer spreads the load out over more of the PV panel frame than a round washer, the rectangular washer edges are straight with sharp cut offs on each side. These sharp cutoffs localize the PV panel frame stress along the rectangular washer edge, forcing the PV panel frame to quickly absorb more load about the rectangular washer edge.

Thus, rectangular washer of FIG. 6B has a low peak loads 608 of 250 N, but has high ramp rates (slope 604) at each end.

FIG. 6C illustrates loading across a PV panel frame secured to a PV panel mounting structure with a custom backing pate (e.g., tapered backing plate 400 of FIG. 4A) subject to an example 1500N environmental load. In FIG. 6A, graph 612 records the load experienced by the PV panel frame relative to the position from the center of the fastener securing the PV panel frame to the PV panel mounting structure (i.e. a through-bolt with a custom backing plate). Graph 612 includes a peak load 614 corresponding to a low point-loading stress concentration and a slope 616 corresponding to a low ramp rate.

The custom backing plate is tuned by its shape and thickness to reduce total fatigue stresses in a PV panel frame by providing support to the PV panel frame flange such that, under environmental loading, the load is distributed into the PV panel frame without a high ramp rate or high point-loading stress concentration. The custom backing plate shape and thickness spreads the load imparted on the PV panel frame across a larger distance than a round washer, which reduces the ramp rate, peak load, and point-loading stress concentration experienced by the PV panel frame. Further, unlike rectangular washers, the varying widths and moderate thickness allows the custom backing plate to flex more at the ends of the plate than around the fastener center. The ability of the custom backing plate to flex more at its ends reduces the rate at which load is absorbed by the PV panel frame about the plate ends, reducing both the ramp rate and the circumstances of point-loading stress concentration when compared to rectangular washer.

Thus, in graph 612, the custom backing plate has a low point-loading concentration resulting in a peak load 614 of 210 N in response to the 1500 N environmental load and a low ramp rate (slope 616). The low point-loading concentration, improved peak load rating, and low ramp rate decrease the risk of PV panel frame fatigue failure and thereby increase the total allowable load cycles of PV panel frames.

We claim:

1. A PV panel mounting for reducing fatigue stress experienced by a PV panel frame comprising:
    a purlin;
    the PV panel frame, the PV panel frame having a flange subject to environmental loading, wherein the flange includes a flange exterior and a flange interior; and
    a binding between the purlin and the PV panel frame including:
        a through-bolt; and
        a tapered backing plate having a first width and a second width, wherein the first width is larger than the second width, wherein the second width is positioned proximate to the flange interior to decrease fatigue stress experienced by the flange interior caused by the environmental loading.

2. The PV panel mounting for reducing fatigue stress experienced by the PV panel frame of claim 1, wherein the tapered backing plate has a decreasing profile section modulus that decreases linearly from the first width to the second width.

3. The PV panel mounting for reducing fatigue stress experienced by the PV panel frame of claim 1, wherein the tapered backing plate has a constant thickness.

4. The PV panel mounting for reducing fatigue stress experienced by the PV panel frame of claim 1, wherein the environmental loading experienced by the flange is caused by:
    wind;
    snow;
    ice;
    a seismic event; or
    temperature fluctuation.

5. The PV panel mounting for reducing fatigue stress experienced by the PV panel frame of claim 1, wherein the environmental loading induces cyclical loading of the PV panel frame.

6. The PV panel mounting for reducing fatigue stress experienced by the PV panel frame of claim 1, wherein the second width of the tapered backing plate is positioned at a distance ranging from 0 mm to 3 mm from a connection point between the flange interior and a vertical box of the PV panel frame.

7. The PV panel mounting for reducing fatigue stress experienced by the PV panel frame of claim 1, wherein the tapered backing plate is configured to provide a particular amount of deflection of the flange under a particular loading condition.

8. The PV panel mounting for reducing fatigue stress experienced by the PV panel frame of claim 1, wherein the tapered backing plate has rounded edges.

9. The PV panel mounting for reducing fatigue stress experienced by the PV panel frame of claim 1, wherein the tapered backing plate induces a low ramp rate in the PV panel frame subject to the environmental loading thereby decreasing the fatigue stress experienced by the flange interior caused by the environmental loading.

10. The PV panel mounting for reducing fatigue stress experienced by the PV panel frame of claim 1, further comprising:
    a superstructure, the superstructure including the purlin, wherein the superstructure is a fixed-tilt apparatus or a tracking apparatus.

11. A PV panel mounting for reducing fatigue stress experienced by a PV panel frame comprising:
    a superstructure;
    the PV panel frame, the PV panel frame having a flange subject to environmental loading, wherein the flange includes a flange exterior and a flange interior; and
    a binding between the superstructure and the PV panel frame including:
        a through-bolt; and
        a tapered backing plate having a first width and a second width, wherein the second width is positioned proximate to the flange interior, wherein the tapered backing plate has an increasing profile section modulus that increases from the second width to the first width configured to induce a low ramp rate in the PV panel frame reducing fatigue stress experienced by the flange interior caused by the environmental loading.

12. The PV panel mounting for reducing fatigue stress experienced by the PV panel frame of claim 11, wherein the first width is larger than the second width.

13. The PV panel mounting for reducing fatigue stress experienced by the PV panel frame of claim 11, wherein the tapered backing plate has a constant thickness.

14. The PV panel mounting for reducing fatigue stress experienced by the PV panel frame of claim 11, wherein the environmental loading induces cyclical loading of the PV panel frame.

15. The PV panel mounting for reducing fatigue stress experienced by the PV panel frame of claim 11, wherein the second width of the tapered backing plate is positioned at a distance ranging from 0 mm to 3 mm from a connection point between the flange interior and a vertical box of the PV panel frame.

16. The PV panel mounting for reducing fatigue stress experienced by the PV panel frame of claim 11, wherein the tapered backing plate is configured to provide a particular amount of deflection of the flange under a particular loading condition.

17. The PV panel mounting for reducing fatigue stress experienced by the PV panel frame of claim 11, wherein the tapered backing plate has rounded edges.

18. The PV panel mounting for reducing fatigue stress experienced by the PV panel frame of claim 11, wherein the superstructure includes a purlin, and wherein the superstructure is a fixed-tilt apparatus or a tracking apparatus.

19. A PV panel mounting for reducing fatigue stress experienced by a PV panel frame comprising:
   a purlin;
   the PV panel frame, the PV panel frame having a flange subject to a particular environmental load, wherein the flange includes a flange exterior and a flange interior; and
   a binding between the purlin and the PV panel frame including:
      a through-bolt; and
      a tapered backing plate having a first width and a second width, wherein the first width is larger than the second width, wherein the second width is positioned proximate to the flange interior to provide a particular amount of deflection of the flange caused by the particular environmental load, the particular amount of deflection of the flange decreasing fatigue stress experienced by the flange interior.

20. The PV panel mounting for reducing fatigue stress experienced by the PV panel frame of claim 19, wherein the tapered backing plate has a decreasing profile section modulus that decreases linearly from the first width to the second width.

21. The PV panel mounting for reducing fatigue stress experienced by the PV panel frame of claim 19, wherein the particular environmental load induces cyclical loading of the PV panel frame.

22. The PV panel mounting for reducing fatigue stress experienced by the PV panel frame of claim 19, wherein the second width of the tapered backing plate is positioned at a distance ranging from 0 mm to 3 mm from a connection point between the flange interior and a vertical box of the PV panel frame.

23. The PV panel mounting for reducing fatigue stress experienced by the PV panel frame of claim 19, wherein the tapered backing plate has rounded edges.

24. The PV panel mounting for reducing fatigue stress experienced by the PV panel frame of claim 19, wherein the tapered backing plate induces a low ramp rate in the PV panel frame subject to the particular environmental load thereby decreasing the fatigue stress experienced by the flange interior caused by the particular environmental load.

25. The PV panel mounting for reducing fatigue stress experienced by the PV panel frame of claim 19, further comprising:
   a superstructure, the superstructure including the purlin, wherein the superstructure is a fixed-tilt apparatus or a tracking apparatus.

\* \* \* \* \*